United States Patent
Vronay et al.

(10) Patent No.: US 7,472,356 B2
(45) Date of Patent: Dec. 30, 2008

(54) COLLAPSIBLE CONTAINER WITH SEMI-COLLAPSED VIEW

(75) Inventors: David P. Vronay, Beijing (CN); Matthew B. MacLaurin, Woodinville, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 662 days.

(21) Appl. No.: 10/776,825

(22) Filed: Feb. 11, 2004

(65) Prior Publication Data

US 2005/0177801 A1    Aug. 11, 2005

(51) Int. Cl.
*G06F 3/048* (2006.01)
(52) U.S. Cl. .................................. 715/828
(58) Field of Classification Search .............. 715/828
See application file for complete search history.

(56) References Cited

U.S. PATENT DOCUMENTS

| | | | |
|---|---|---|---|
| 5,515,487 A | 5/1996 | Beaudet et al. | |
| 5,878,410 A | 3/1999 | Zbikowski et al. | |
| 5,977,971 A | 11/1999 | Guzak et al. | |
| 6,035,309 A | 3/2000 | Dauerer et al. | |
| 6,098,072 A | 8/2000 | Sluiman et al. | |
| 6,192,367 B1 | 2/2001 | Hawley et al. | |
| 6,281,896 B1 | 8/2001 | Alimpich et al. | |
| 6,448,985 B1 | 9/2002 | McNally et al. | |
| 6,883,143 B2 * | 4/2005 | Driskell | 715/763 |
| 7,191,411 B2 * | 3/2007 | Moehrle | 715/855 |
| 2002/0149623 A1 * | 10/2002 | West et al. | 345/765 |
| 2007/0198930 A1 * | 8/2007 | Chu et al. | 715/713 |

OTHER PUBLICATIONS

Screen Dumps of Microsoft Windows XP (2001, pp. 1-5).*
Screen Dumps of Internet Explorer (2001, pp. 1-5).*
Screen Dumps of East (1999, pp. 1-4).*
Gary Marsden and David E. Cairns. Improving the Usability of the Hierarchical File System. Proceedings of the 2003 Annual Conference of the South African Institute of Computer Scientists on Enablement through Technology, pp. 122-129, 2003.

* cited by examiner

*Primary Examiner*—Stephen S Hong
*Assistant Examiner*—Le Nguyen
(74) *Attorney, Agent, or Firm*—Amin, Turocy & Calvin, LLP

(57) ABSTRACT

A user interface system and method of displaying lists of information using a squeezed/semi-collapsed state of the group that shows, for example, a portion of the group (e.g., only the first few items of the group) is provided. The squeezed/semi-collapsed state takes up less room on the screen than an open state but gives the user more information about the group than the closed state, allowing more groups to be visible simultaneously while still providing detailed information about the contents of the group.

22 Claims, 9 Drawing Sheets

COLLAPSIBLE CONTAINER WITH SEMI-COLLAPSED VIEW

TECHNICAL FIELD

The present invention relates generally to information viewing system(s), and more particularly, to a user interface system and method of displaying lists of information using a squeezed/semi-collapsed state of a group.

BACKGROUND OF THE INVENTION

Information viewing system(s) (e.g., file viewer(s)) which allow grouping can permit group(s) to be collapsible such that the contents of a group can be individually shown or hidden. When the contents are shown, the group is said to be "expanded"; when the contents are collapsed, the group is said to be "collapsed."

With the advent of extremely large storage devices and network-based storages, the need for working effectively with very long lists of items—such as those returned by a web search—is becoming increasingly important.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention facilitates an improved user interface system and method of displaying lists of information using a squeezed/semi-collapsed state of the group that shows, for example, a portion of the group (e.g., only the first few items of the group). The squeezed/semi-collapsed state takes up less room on the screen than an open state but gives the user more information about the group than the closed state, allowing more groups to be visible simultaneously while still providing detailed information about the contents of the group.

An aspect of the present invention provides for an information viewer system that facilitates viewing of data set(s) in a semi-collapsed state. A data set can include for example, a logical and/or physical grouping of data item(s). The grouping can be based, for example, upon physical location (e.g., disk drive), author, creation time/date, modification time/date, data item size, data item type, data item category and/or user criteria (e.g., based on content of data item). A data item can be, for example, a file (e.g., image and/or data).

The system includes a set component that identifies sets of data, and, a display component that displays the sets of data. For example, the display component can display at least one data set in a squeezed/semi-collapsed state.

The system can provide a mechanism for a user to rapidly scan and evaluate very long lists of information more quickly than existing mechanisms. The system can further provide architectural support for optimizing the computational cost of displaying large lists.

In one example, the system is employed as a file viewer, used for examining the contents of a hard drive in a graphical fashion. The system facilitates a displaying a squeezed/semi-collapsed state (e.g., only the first few items of the group).

The squeezed/semi-collapsed state group takes up less room on the screen than an open state, but gives the user more information about the group than the closed state. This allows more groups to be visible simultaneously while still providing detailed information about the contents of the group. A user can quickly evaluate the groups in a large set of items, which in turn provides more efficient evaluation and manipulation of large groups of items.

Information displayed in the semi-collapsed view can be based, at least in part, for example, upon a user's preference. For example, a first user can prefer that substantially all display regions are viewed in the squeezed/semi-collapsed state, while, another a second user can prefer that a particular data set is displayed in the squeezed/semi-collapsed state. Further, information displayed in the semi-collapsed view can be based, at least in part, upon inference of a user's preference and/or user selection.

Additionally and/or alternatively information can be displayed in the semi-collapsed view based, at least in part, upon a user state. For example, a user having a word processing application instantiated can view word processing application document(s) displayed in the squeeze/semi-collapsed state to facilitate easier selection of relevant document(s).

Further, a history of a user can be employed to determine information displayed in the semi-collapsed view. For example, a user that has historically preferred image file(s) displayed can have image file(s) displayed in the semi-collapsed state.

Also, a user's focus of attention can be employed to determine information displayed in the semi-collapsed view. For example, a user working with image based applications can have image file(s) displayed in the semi-collapsed view.

Optionally, information displayed in the semi-collapsed view can be color-coded to facilitate the user's viewing experience. Further, a quantity of data items displayed in the semi-collapsed view can be based, at least in part, upon a function of available display area, for example, to maximize relevant information presented to the user.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
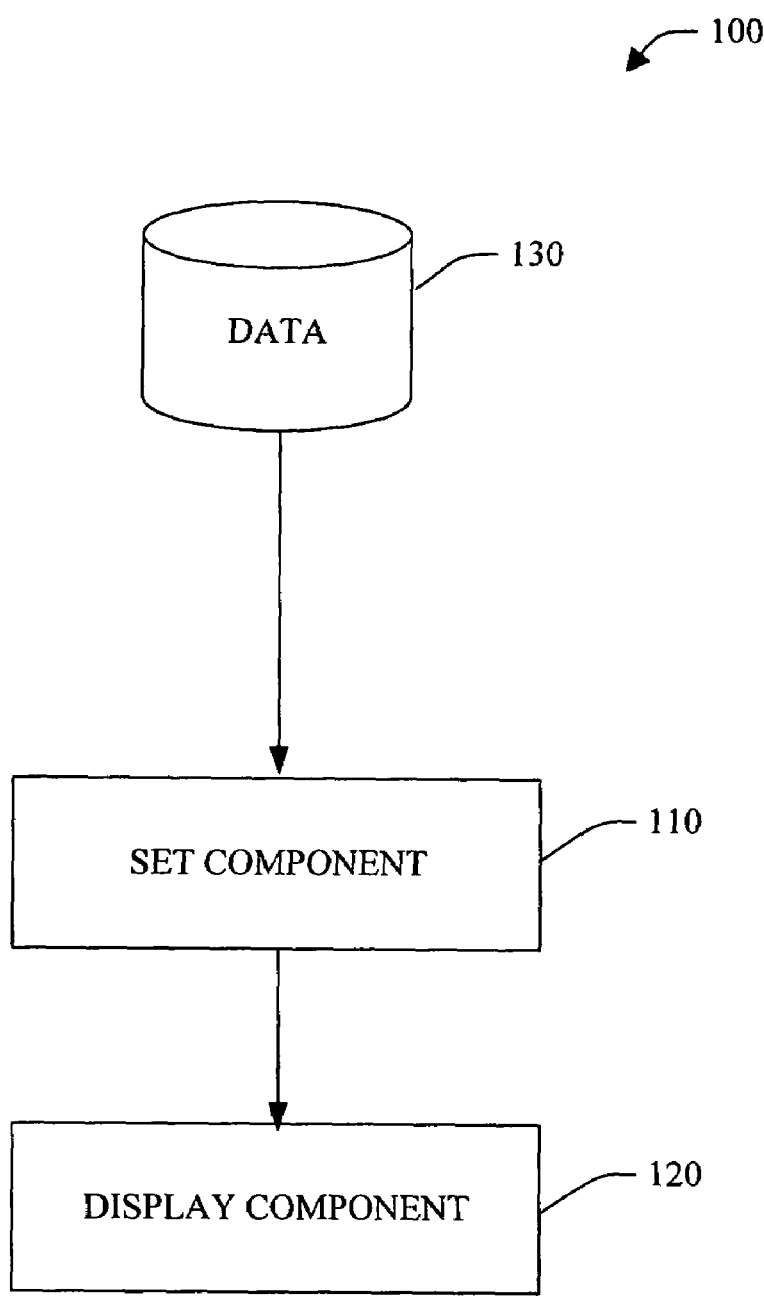
FIG. 1 is a block diagram of an information viewer system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Information viewing system(s) (e.g., file viewer(s)) which allow grouping can permit group(s) to be collapsible such that the contents of a group can be individually shown or hidden. When the contents are shown, the group is said to be "expanded"; when the contents are collapsed, the group is said to be "collapsed."

The present invention facilitates an improved user interface system and method of displaying long lists of information using a third squeezed/semi-collapsed state of the group that shows, for example, a portion of the group (e.g., only the first few items of the group). In one example, a single button is clicked repeatedly to cycle between the expanded, squeezed/semi-collapsed, and collapsed states. The squeezed/semi-collapsed state takes up less room on the screen than an open state but gives the user more information about the group than the closed state, allowing more groups to be visible simultaneously while still providing detailed information about the contents of the group. While the present invention is generally described with respect to files, those skilled in the art will recognize that any item (e.g., file(s) and/or image(s), such as photograph(s)) can be displayed in accordance with the present invention. It is to be appreciated that any type of item suitable for display by the system and/or method of the present invention can be employed and all such types of item(s) are intended to fall within the scope of the hereto appended claims.

Referring to FIG. 1, an information viewer system 100 in accordance with an aspect of the present invention is illustrated. The system 100 can facilitate viewing of data set(s) in a semi-collapsed state.

A data set can include for example, a logical and/or physical grouping of data item(s). The grouping can be based, for example, upon physical location (e.g., disk drive), author, creation time/date, modification time/date, data item size, data item type, data item category and/or user criteria (e.g., based on content of data item). A data item can be, for example, a file (e.g., image and/or data). For example, the data item can be associated with an image (e.g., photograph) with the semi-collapsed view displaying a collage photo thumbnails and the expanded view displaying larger photos (e.g., with additional information).

The system 100 includes a set component 110 that identifies sets of data 130, and, a display component 120 that displays the sets of data 130. For example, the display component 120 can display at least one data set in a squeezed/semi-collapsed state.

The system 100 can provide a mechanism for a user to rapidly scan and evaluate very long lists of information more quickly than existing mechanisms. The system 100 can further provide architectural support for optimizing the computational cost of displaying large lists.

In one example, the system 100 is employed as a file viewer, used for examining the contents of a hard drive in a graphical fashion. In conventional file viewers, the contents of a directory or of a file search is displayed as a continuous list of items. Some conventional file viewers have allowed grouping of items—separated into sections—according to a common attribute such as date or author.

In file viewers which allow grouping, groups can be "collapsible"—the contents of a group may be individually shown or hidden. When the contents are shown, the group is said to be "expanded"; when the contents are collapsed, the group is said to be "collapsed."

The system 100 facilitates a third state which shows a squeezed/semi-collapsed state (e.g., only the first few items of the group). In one example, a single button is clicked repeatedly to cycle between the expanded, squeezed, and collapsed states.

An advantage of the squeezed/semi-collapsed state is that the group takes up less room on the screen than an open state, but gives the user more information about the group than the closed state. This allows more groups to be visible simultaneously while still providing detailed information about the contents of the group. A user can quickly evaluate the groups in a large set of items, which in turn provides more efficient evaluation and manipulation of large groups of items.

Information displayed in the semi-collapsed view can be based, at least in part, for example, upon a user's preference. For example, a first user can prefer that substantially all display regions are viewed in the squeezed/semi-collapsed state, while, another a second user can prefer that a particular data set is displayed in the squeezed/semi-collapsed state. Further, information displayed in the semi-collapsed view can be based, at least in part, upon inference of a user's preference and/or user selection.

Additionally and/or alternatively information can be displayed in the semi-collapsed view based, at least in part, upon a user state. For example, a user having a word processing application instantiated can view word processing application document(s) displayed in the squeeze/semi-collapsed state to facilitate easier selection of relevant document(s).

Further, a history of a user can be employed to determine information displayed in the semi-collapsed view. For example, a user that has historically preferred image file(s) displayed can have image file(s) displayed in the semi-collapsed state.

Also, a user's focus of attention can be employed to determine information displayed in the semi-collapsed view. For example, a user working with image based applications can have image file(s) displayed in the semi-collapsed view.

Optionally, information displayed in the semi-collapsed view can be color-coded to facilitate the user's viewing experience. Further, a quantity of data items displayed in the semi-collapsed view can be based, at least in part, upon a function of available display area, for example, to maximize relevant information presented to the user.

It is to be appreciated that the system 100, the set component 110 and/or the display component 120 can be computer components as that term is defined herein.

Figure 2:
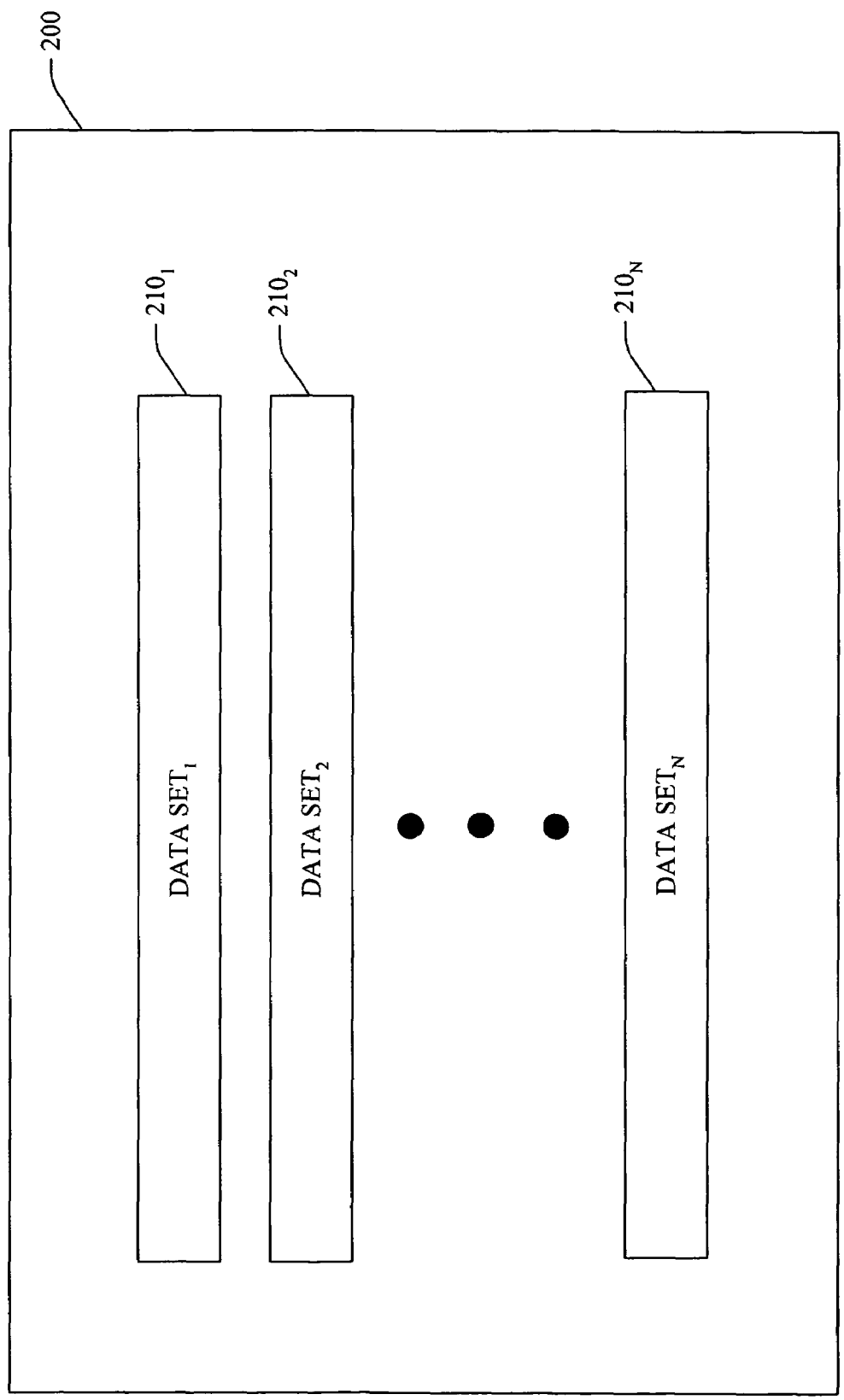
FIG. 2 is a diagram of user interface displaying a plurality of data sets in accordance with an aspect of the present invention.

Turning briefly to FIG. 2, a user interface 200 displaying a plurality of data sets 210 is illustrated. In this example, the data sets 210 are displayed in a collapsed state such that information associated with individual item(s) of the data sets 210 is not displayed.

Figure 3:
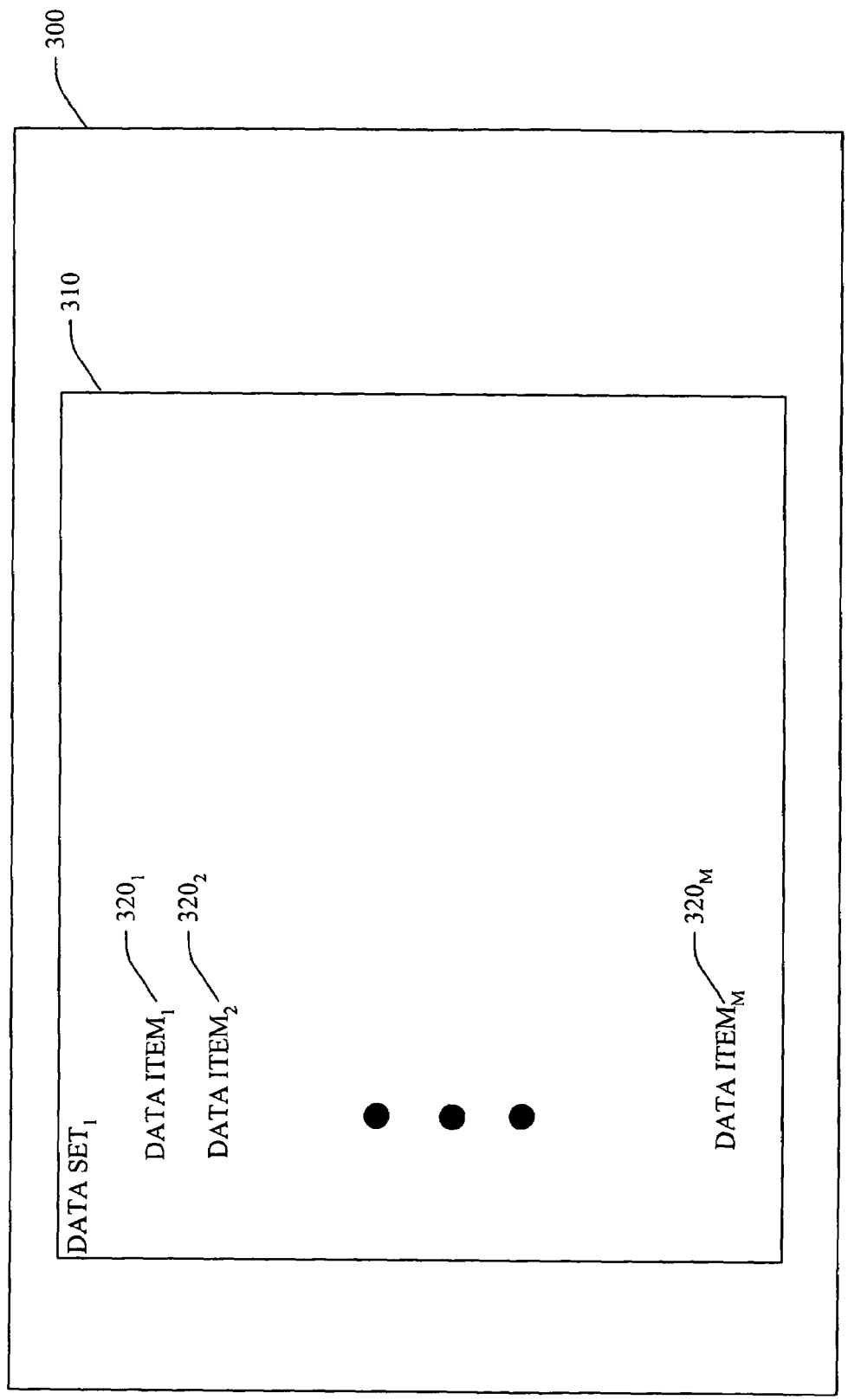
FIG. 3 is a diagram of a user interface displaying a data set in accordance with an aspect of the present invention.

Next, referring briefly to FIG. 3, a user interface 300 displaying a data set 310 is illustrated. In this example, the data set 310 is displayed in an expanded state such that information associated with data item(s) 320 is displayed. The data item(s) can be, for example, file(s) with the information associated with the data item(s) 320 including a type of file, category of file, physical and/or logical location of the file, and, date/time associated with the file.

Figure 4:
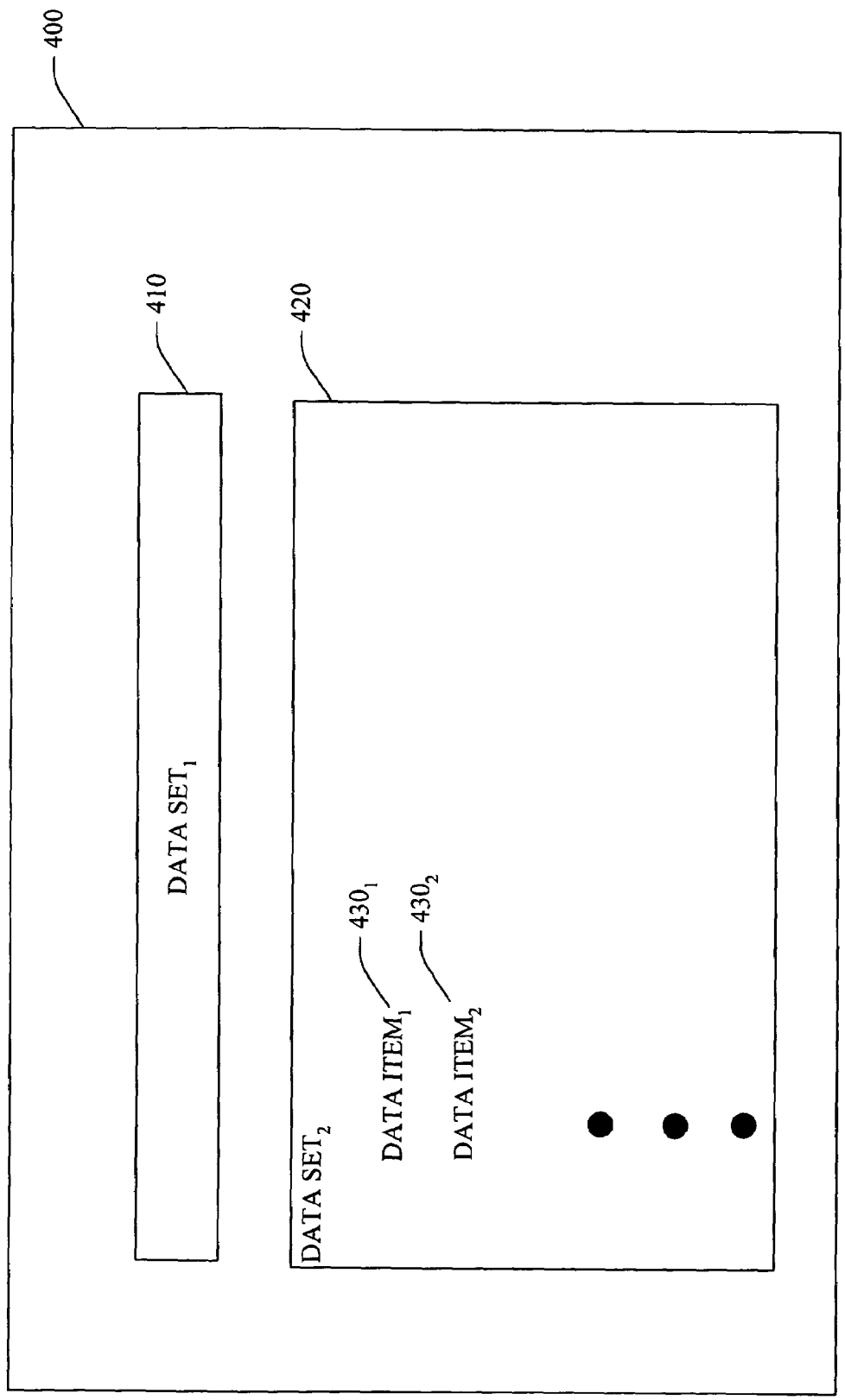
FIG. 4 is a diagram of an exemplary user interface in accordance with an aspect of the present invention.

Referring to FIG. 4, an exemplary user interface 400 in accordance with an aspect of the present invention is illustrated. The user interface 400 includes a first data set 410 displayed in a collapsed state and a second data set 420 displayed in a squeezed/semi-expanded state. In the squeezed/semi-expanded state, some of the data items 430 that comprise the second data set 420 are displayed while other data items that comprise the second data set 420 are not displayed.

Figure 5:
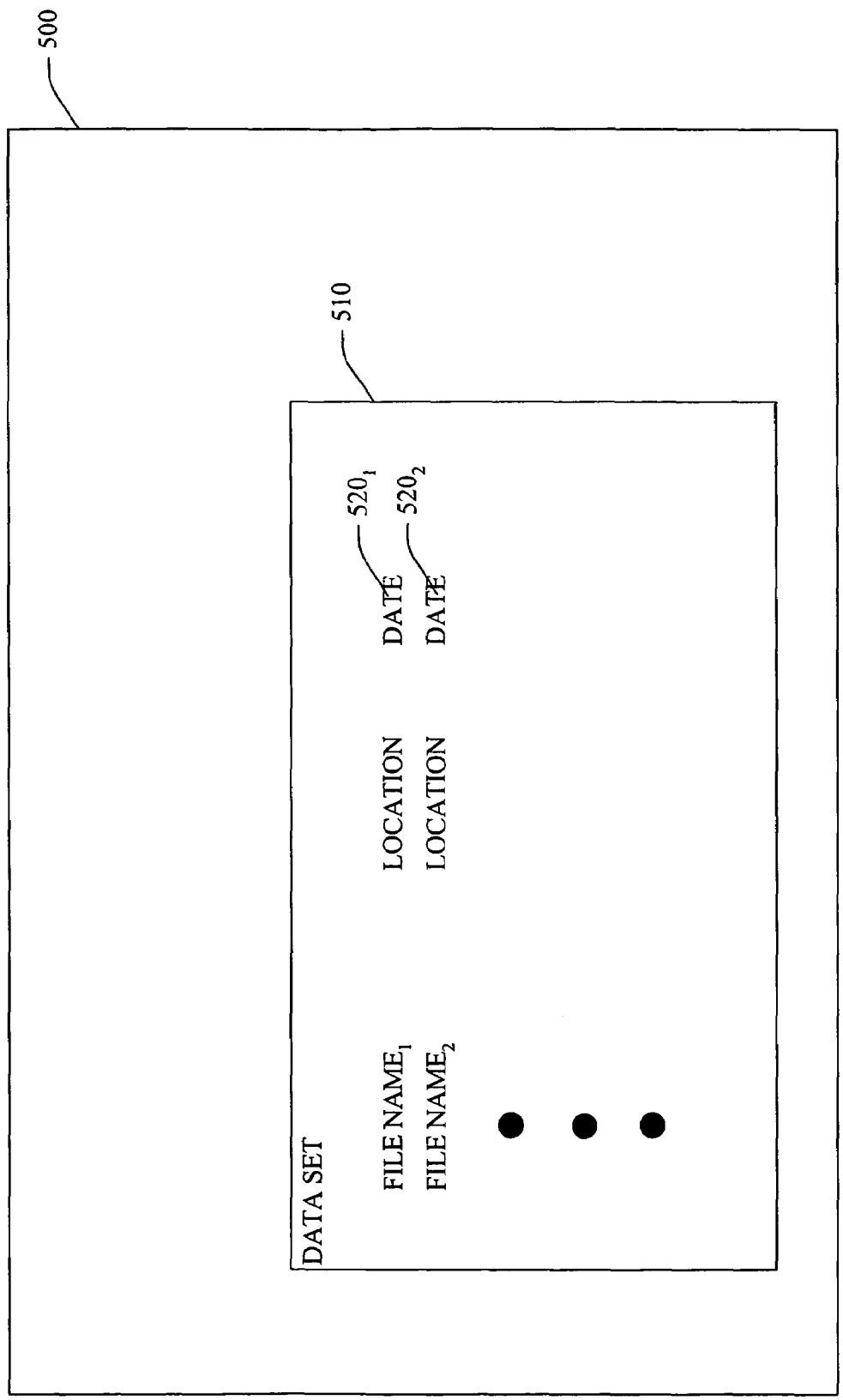
FIG. 5 is a diagram of an exemplary user interface in accordance with an aspect of the present invention.

Turning to FIG. 5, an exemplary user interface 500 in accordance with an aspect of the present invention is illustrated. The user interface 500 includes a data set 510 in a squeezed/semi-expanded state. In this example, file name, location and date are displayed for data items 520 that are visible in the squeezed/semi-expanded state.

Navigation of Squeezed/semi-expanded Data Set(s)

Figure 6:
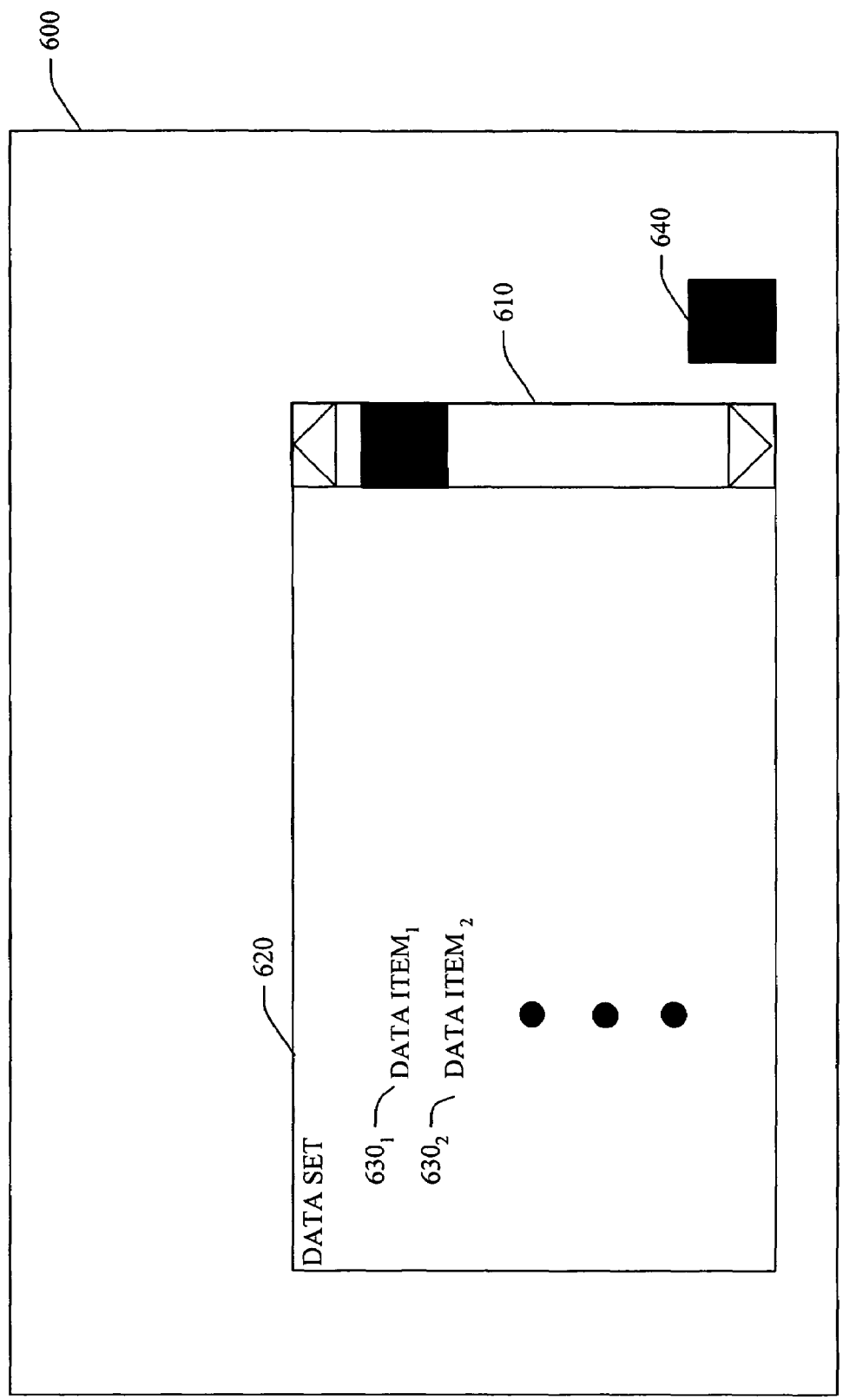
FIG. 6 is a diagram of an exemplary user interface in accordance with an aspect of the present invention.

User interface(s) and/or input device(s) (e.g., mouse and/or keyboard) can be employed to facilitate navigation of data set(s) displayed in the squeezed/semi-expanded state. Referring to FIG. 6, an exemplary user interface 600 in accordance with an aspect of the present invention is illustrated. In this example, a scroll bar 610 facilitates navigation through a data set 620 having a plurality of data items 630. The scroll bar can allow viewing of data item(s) hidden by the squeeze/semi-expanded state.

Additionally and/or alternatively, the user interface 600 can further include a control 640 that facilitates scrolling through the plurality of data items 630. For example, in response to a user placing a pointing device's cursor in proximity of and/or over the control 640, the data set 620 can be presented (e.g., scrolled). The speed of the presentation (e.g., scrolling) can be based, for example, up a user's preference and/or upon a length of time that the control 640 has been active.

Figure 7:
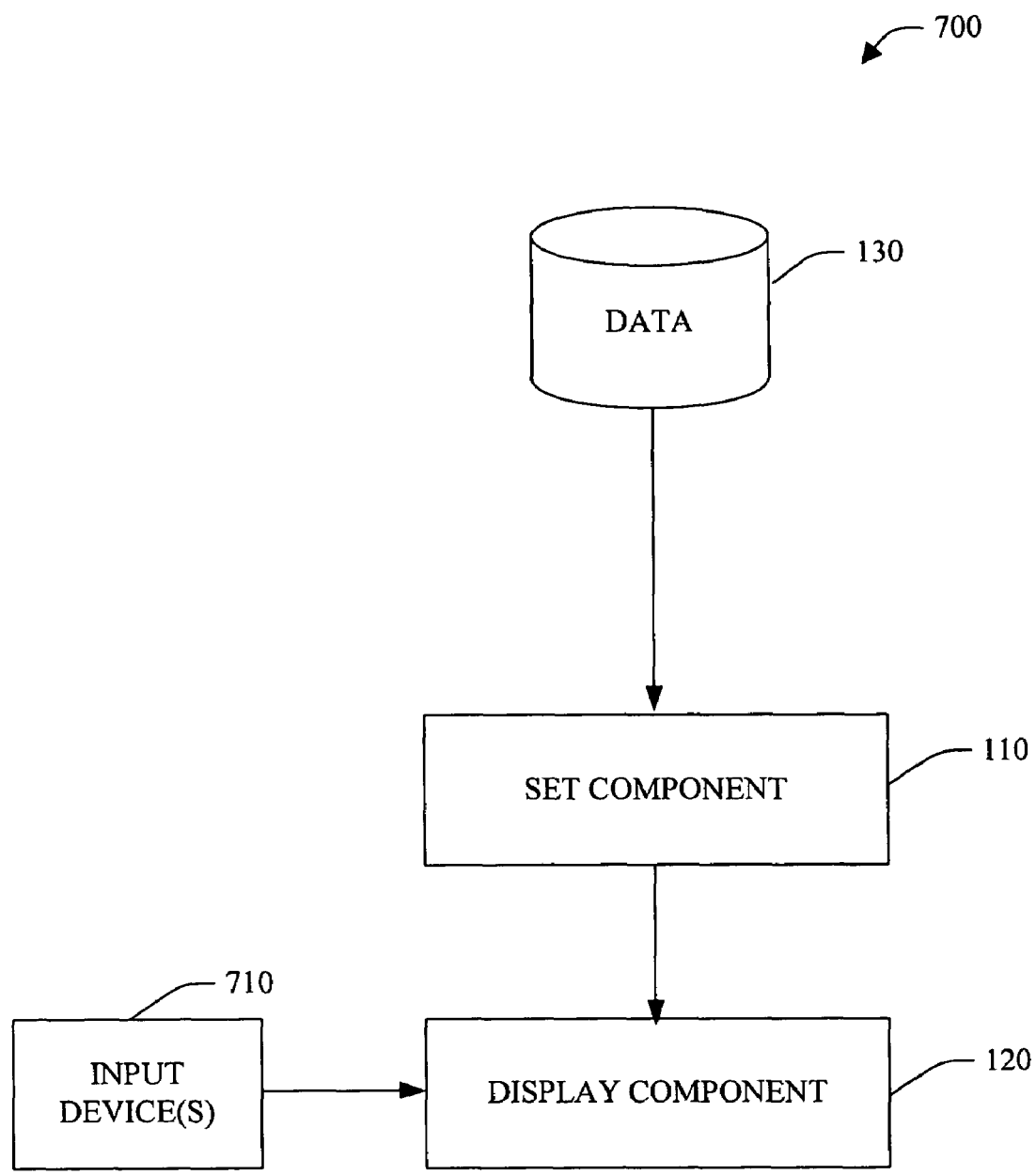
FIG. 7 is a block diagram of an information viewer system in accordance with an aspect of the present invention.

Turning briefly to FIG. 7, an information viewer system 700 in accordance with an aspect of the present invention is illustrated. The system 700 includes a set component 110, a display component 120 and input device(s) 710.

The input device(s) 710 can facilitate viewing of set(s) of data 130 in a semi-collapsed state. For example, arrow and/or cursor key(s) on a keyboard allow a viewer to show previously hidden items in the group by selecting a visible item and pressing a cursor key to select the next or previous item in the group. As hidden items are selected, they are moved vertically in the group to become visible.

It is to be appreciated that the system 700 and/or the input device(s) 710 can be computer components as that term is defined herein.

Figure 8:
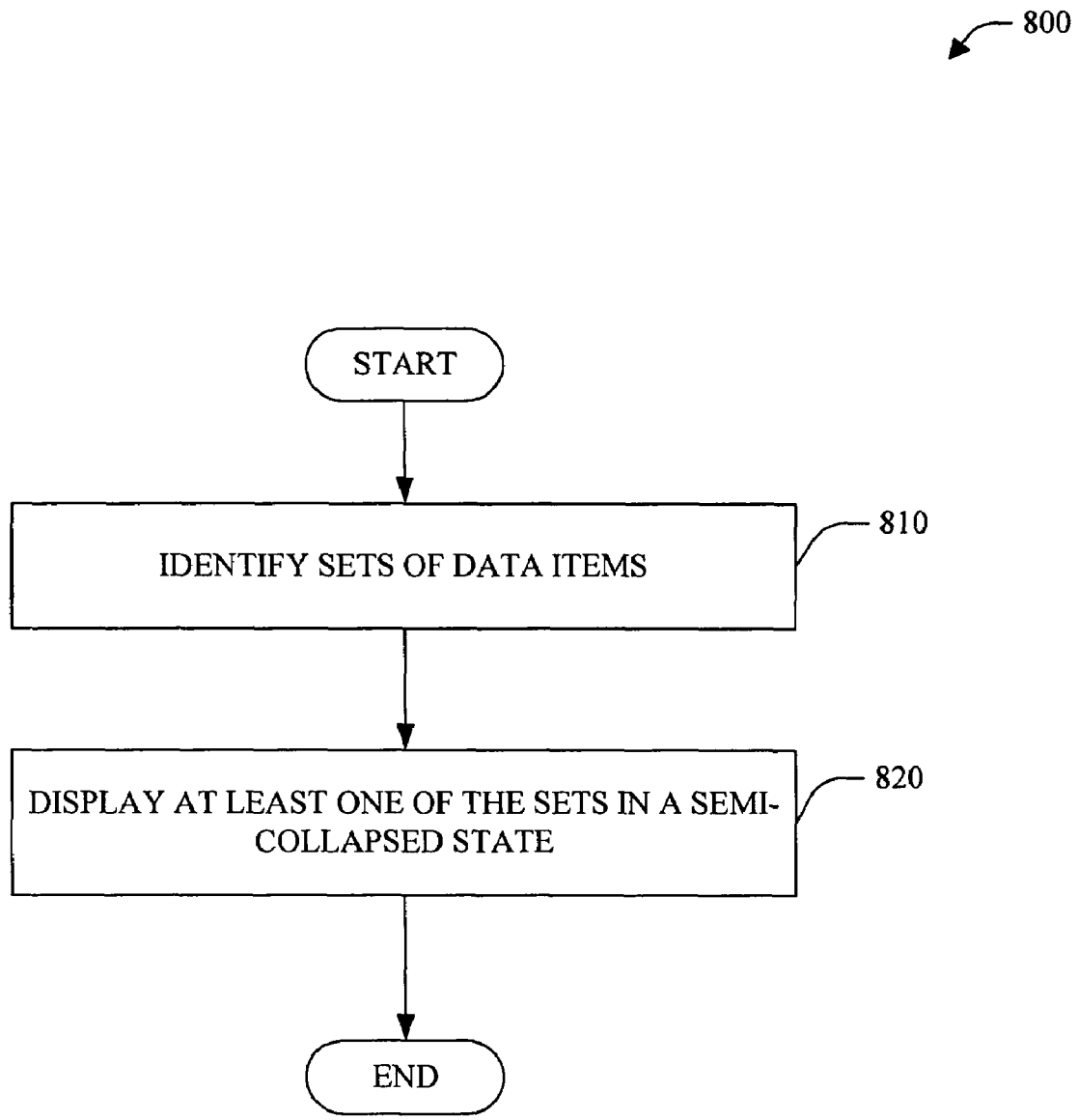
FIG. 8 is a flow chart of a method that facilitates access to data in accordance with an aspect of the present invention.

Turning briefly to FIG. 8, a methodology that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 8, a method that facilitates access to data 800 in accordance with an aspect of the present invention is illustrated. At 810, sets of data items are identified (e.g., by a set component 110). At 820, at least one of the sets is displayed in a semi-collapsed state (e.g., by a display component 120).

Figure 9:
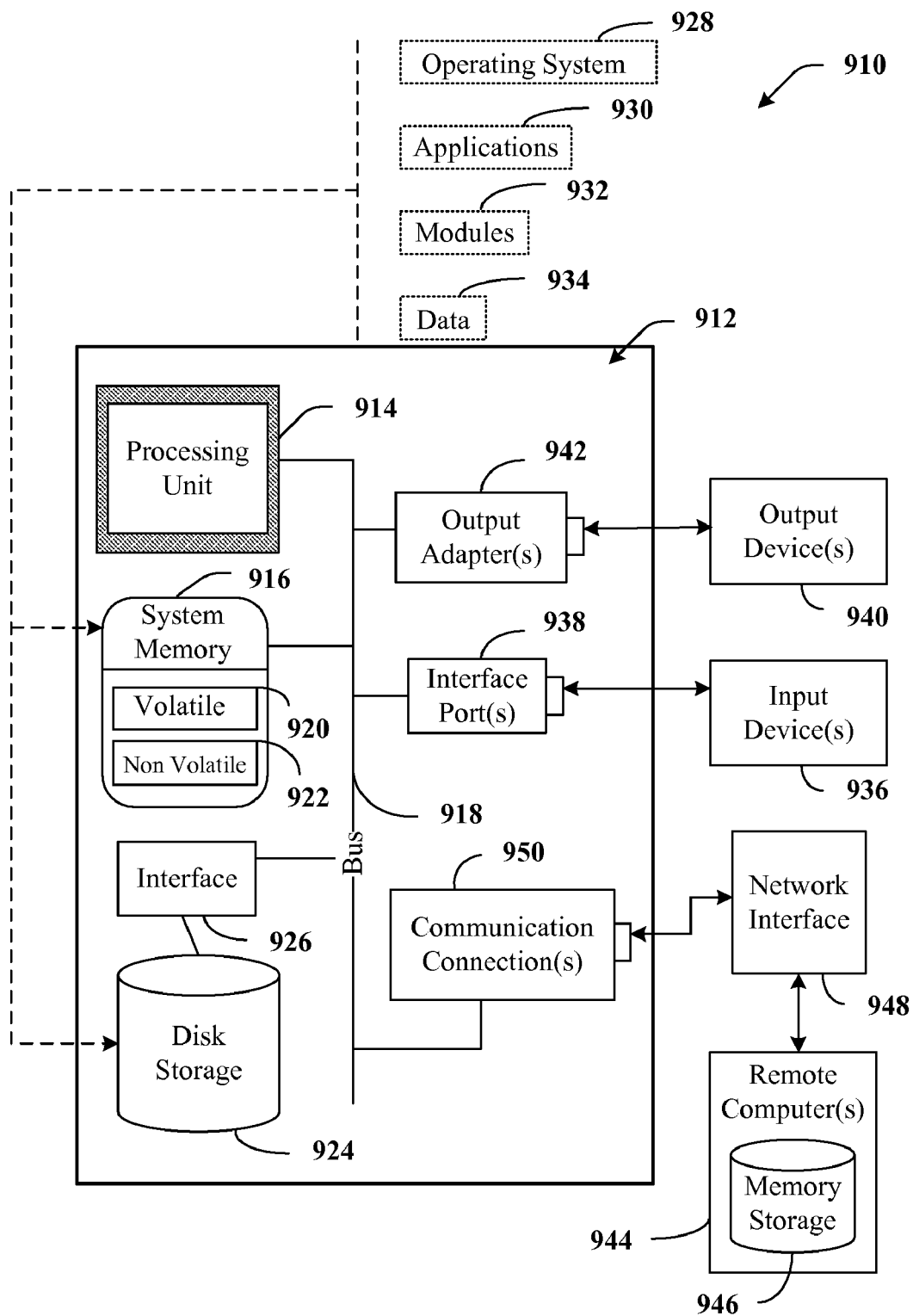
FIG. 9 illustrates an example operating environment in which the present invention may function.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914.

The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium having stored thereon computer-executable components of a system that facilitates access to data, the system comprising:
    a set component that identifies data sets;
    a component that determines data in at least one data set to be displayed in a semi-collapsed view by selecting data in the at least one data set having a data type corresponding to a currently instantiated application selected from a plurality of currently instantiated applications, wherein the plurality of currently instantiated applications have disparate data types respectively associated therewith;

a button for selecting a view; and a display component that displays the determined data in the at least one data set in the semi-collapsed view and directly cycles through the semi-collapsed view, a collapsed view, and an expanded view of the at least one data set upon repeated selection of the button.

2. The system of claim 1, the display component view displaying a subset of the at least one data set in an expanded view, and another subset in a collapsed view.

3. The system of claim 1, information displayed in the semi-collapsed view being based, at least in part, upon inference of a user's preference.

4. The system of claim 1, a quantity of data items displayed in the semi-collapsed view being based, at least in part, upon a user selection.

5. The system of claim 1, a quantity of data items displayed in the semi-collapsed view being based, at least in part, upon a function of available display area.

6. The system of claim 1, cycling being based, at least in part, upon user input.

7. The system of claim 1, information displayed in the semi-collapsed view being based, at least in part, upon a user state.

8. The system of claim 1, information displayed in the semi-collapsed view being based, at least in part, upon a history of a user.

9. The system of claim 1, information displayed in the semi-collapsed view being based, at least in part, upon a user's focus of attention.

10. The system of claim 1, wherein at least some of the information displayed in the semi-collapsed view is color-coded.

11. The system of claim 1, the data sets representing a logical or physical grouping of data items.

12. The system of claim 11, grouping being based, at least in part, upon at least one of physical location of the data items, author of the data items, creation time or date of the data items, modification time or date of the data items, data item size, data item type, data item category and content of the data items.

13. The system of claim 11, wherein at least some of the data items are computer files.

14. A file viewer employing the system of claim 1.

15. The system of claim 1, further comprising an input device that facilitates navigation of the semi-collapsed view.

16. A method that facilitates access to data comprising:

identifying sets of data items;

identifying information in at least one set of data items to be displayed in a semi-collapsed state at least in part by determining information in the at least one set having an information type that is associated with an application selected from a plurality of applications currently instantiated by a user, the plurality of applications currently instantiated by the user having respective disparate information types associated therewith;

displaying a button for selecting a view;

displaying the identified information in the semi-collapsed state; and, cycling the display directly through the semi-collapsed state, a collapsed state, and an expanded state upon repeated selection of the button.

17. A computer readable medium having stored thereon computer executable instructions for carrying out the method of claim 16.

18. A computer-readable storage medium having stored thereon computer-executable code which, when executed by a computer, causes the computer to display a user interface comprising:

a button for selecting a view;

a first region displaying selected data items of a first data set in a view that cycles directly through a semi-collapsed view, an expanded view, and a collapsed view upon repeated selection of the button, the selected data items are determined based on respective classifications of the data items, one or more applications associated with a user, and one or more respective data types utilized by the one or more currently running applications associated with the user; and, a second region displaying data items of a second data set in a collapsed or expanded view.

19. The user interface of claim 18, further comprising a control region that facilitates scrolling through the first data set of the first region.

20. The user interface of claim 18, the first region further comprising a scroll bar that facilitates access to the data items of the first data set.

21. An application running on a computer component and stored on a computer-readable storage medium, the application facilitates access to data by instructing communication of a signal having one or more data packets, the data packets comprising:

a button for selecting a view;

a first field comprising information associated with at least one data set to be displayed in a semi-collapsed view, a collapsed view, or an expanded view upon repeated selection of the button, the view displayed determined by a direct cycling, items displayed in the semi-collapsed view are selected at least in part by identifying respective items in the at least one data set having an information type that corresponds to an executing application in a plurality of executing applications respectively having disparate information types corresponding thereto; and, a second field comprising information associated with another data set to be displayed in at least one of an expanded view and a collapsed view.

22. A computer-readable storage medium having stored thereon computer-executable components of a system that facilitates access to data, the system comprising:

means for identifying sets of data;

means for displaying a button for selecting a view;

means for selecting data in at least one identified set of data for display in a semi-collapsed view at least in part by selecting data in the at least one identified set of data that relates to an application selected from a plurality of executing applications being employed by a user;

means for displaying the data selected from the at least one identified set of data in the semi-collapsed view; and, means for cycling the display directly through the semi-collapsed view, a collapsed view, and an expanded view upon repeated selection of the button.

* * * * *